United States Patent
Zhang et al.

(10) Patent No.: US 7,922,370 B2
(45) Date of Patent: Apr. 12, 2011

(54) LED MODULE

(75) Inventors: Hai-Wei Zhang, Shenzhen (CN);
Xing-Gui Huang, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/608,970

(22) Filed: Oct. 29, 2009

(65) Prior Publication Data

US 2011/0026247 A1   Feb. 3, 2011

(30) Foreign Application Priority Data

Jul. 31, 2009   (CN) .......................... 2009 1 0305088

(51) Int. Cl.
*F21V 5/00* (2006.01)

(52) U.S. Cl. ................... 362/311.02; 362/800; 362/520; 362/311.06

(58) Field of Classification Search ................ 362/520, 362/311.02, 311.06, 311.07, 311.08, 311.09, 362/311.1, 311.11, 800
See application file for complete search history.

(56) References Cited

U.S. PATENT DOCUMENTS

| | | | |
|---|---|---|---|
| 2008/0100773 A1* | 5/2008 | Hwang et al. | 349/62 |
| 2008/0273327 A1* | 11/2008 | Wilcox et al. | 362/267 |
| 2009/0225551 A1* | 9/2009 | Chang et al. | 362/311.06 |

* cited by examiner

*Primary Examiner* — Laura Tso
(74) *Attorney, Agent, or Firm* — Frank R. Niranjan

(57) ABSTRACT

An LED module includes an LED and an elongated lens. The lens includes a center axis, a concave incident face, and an opposite convex emitting face. The emitting face includes a portion with a curvature radius at any point along a first plane larger than a distance between the point and the LED, and larger than a curvature radius at a corresponding point of the incident face on the first plane. A curvature radius at any point of the portion of the emitting face along a second plane perpendicularly intersected with the first plane at the center axis is larger than a distance between the point and the LED, while smaller than a curvature radius of a corresponding point at the incident face on the second plane. A radiating angle of the LED module in the first plane is larger than that in the second plane.

20 Claims, 7 Drawing Sheets

LED MODULE

BACKGROUND

1. Technical Field

The present disclosure relates generally to LED modules, and more particularly to an LED module with an improved lens.

2. Description of Related Art

LED lamp, a solid-state lighting, utilizes LEDs as a source of illumination, providing advantages such as resistance to shock and nearly limitless lifetime under specific conditions. Thus, LED lamps present a cost-effective yet high quality replacement for incandescent and fluorescent lamps.

Known implementations of LED modules in an LED lamp employ lenses for focusing light generated by the LEDs. However, a light pattern provided by such LED module is substantially round, which is not suitable for illuminating a certain location, such as roadway. For a roadway, it is required that the light generated by the lamp is directed along the extending direction of the roadway and altogether illuminates a road surface of the roadway. It is preferable that the light is prevented from lighting on a region neighboring a roadside of the roadway, such as houses beside the roadway. Apparently, the round light pattern provided by the conventional LED modules can not satisfy such a requirement.

What is need therefore is an LED module which can overcome the above limitations.

DETAILED DESCRIPTION

FIGS. 1 to 4 illustrate an LED module in accordance with an exemplary embodiment, which includes an LED 10 and a lens 20 covering the LED 10.

Figure 1:
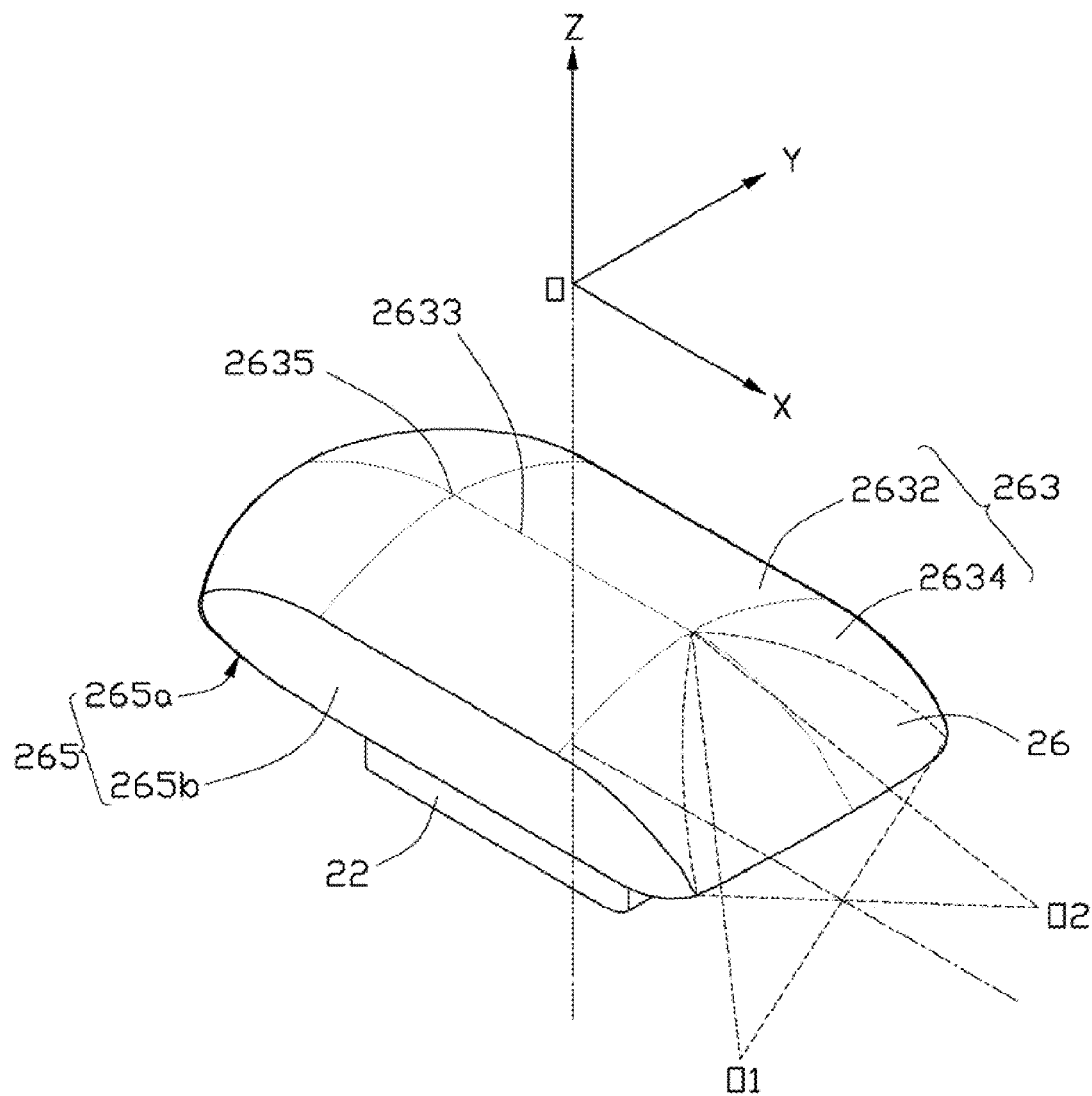
FIG. 1 is an isometric, assembled view of an LED module in accordance with an exemplary embodiment.

Referring to FIG. 1, a three dimensional coordinate system, with origin O and axes X, Y and Z, oriented as shown by the arrows in FIG. 1, is adopted to clearly describe the LED module. Any two of the three axes X, Y, Z are perpendicular to each other. The X-axis and the Z-axis cooperatively define a first plane XOZ, the Y-axis and the Z-axis cooperatively define a second plane YOZ, and the X-axis and the Y-axis cooperatively define a third plane XOY. The first plane XOZ and the second plane YOZ are vertical, and are perpendicularly intersected at the Z-axis. The third plane XOY is horizontal, perpendicularly intersected to the first plane XOZ at the X-axis and perpendicularly intersected to the second plane YOZ at the Y-axis.

Figure 2:
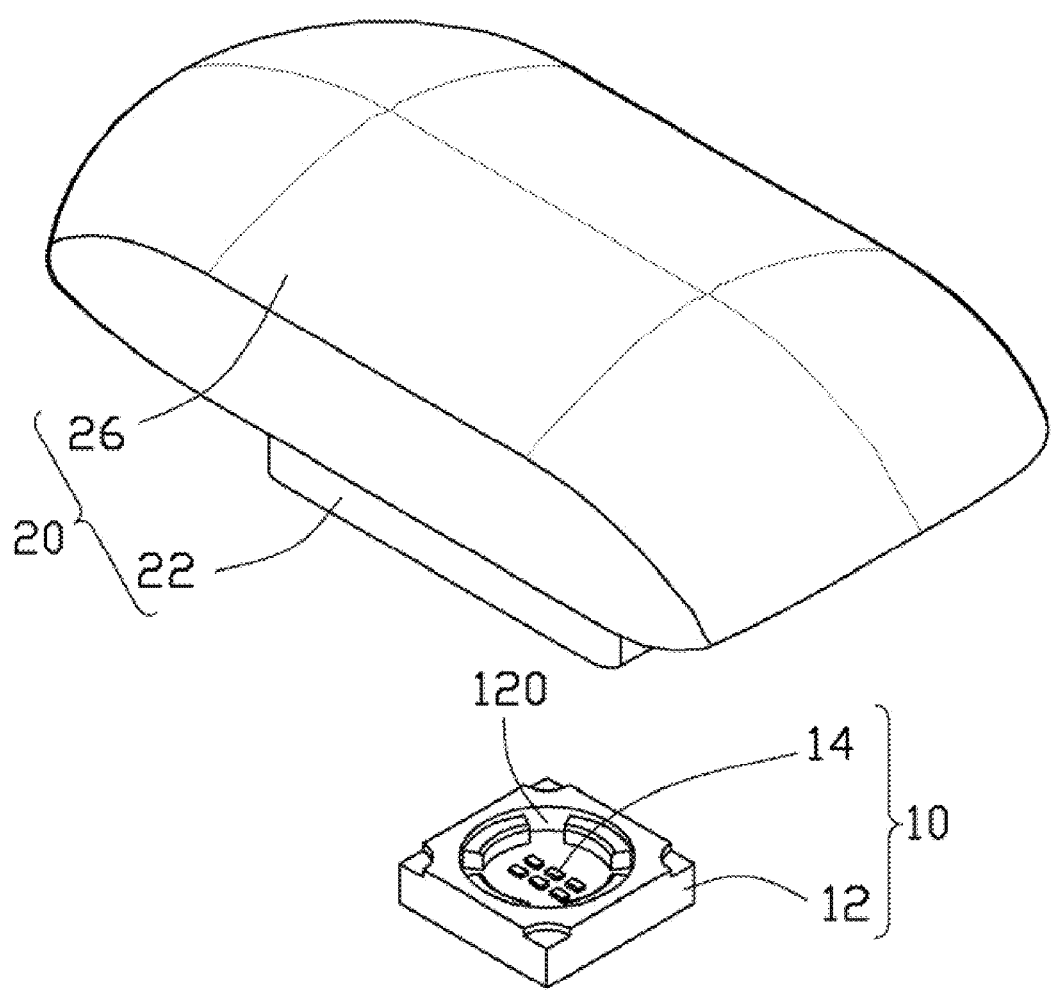
FIG. 2 is an exploded view of the LED module of FIG. 1.
Figure 4:
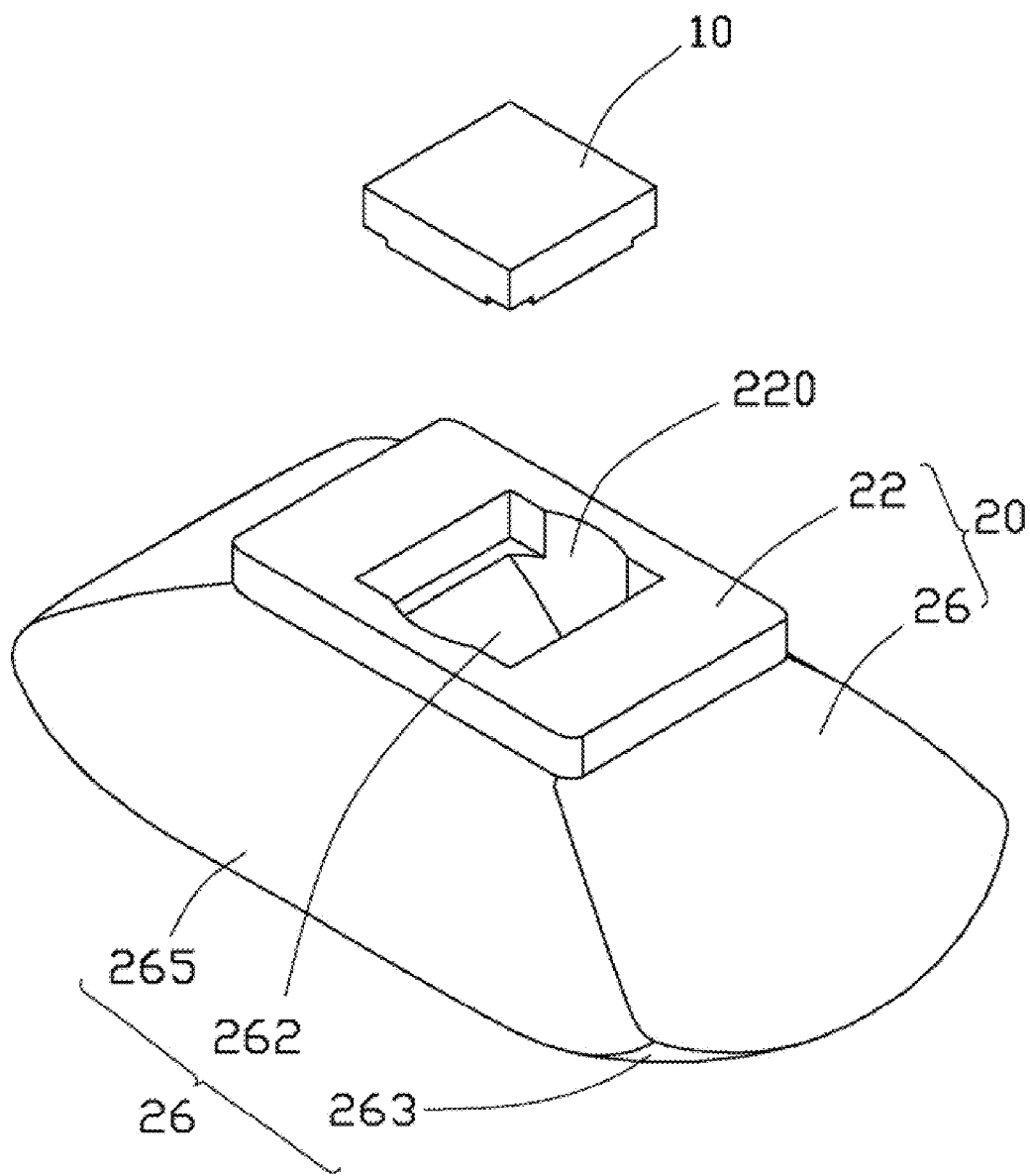
FIG. 4 is an exploded view of FIG. 3.

Referring to FIGS. 2 and 4, the LED 10 includes a rectangular base 12 and a plurality of LED chips 14. A circular concave 120 is defined in a top of the base 12. A center of the concave 120 is located on the Z-axis. The LED chips 14 are arranged in the concave 120. In this embodiment, six LED chips 14 are shown, being arranged in two lines along the X-axis by three rows along the Y-axis.

Referring to FIG. 1 again, the lens 20 is integrally made of a transparent material with good optical performance, such as PMMA (poly (methyl methacrylate)) or PC (polycarbonate). The lens 20 is elongated, with a length along the X-axis being longer than a width along the Y-axis. Preferably, the width of the lens 20 is approximately a half of the length thereof. The lens 20 has a central optical axis coincidental with the Z-axis. Further, the lens 20 is symmetric relative to the first plane XOZ, and is symmetric relative to the second plane YOZ. The lens 20 can be used in a lighting fixture to achieve a desired illumination in such as but not limited to, roadway, with the first plane XOZ aligned with the longitudinal direction of the roadway.

Figure 3:
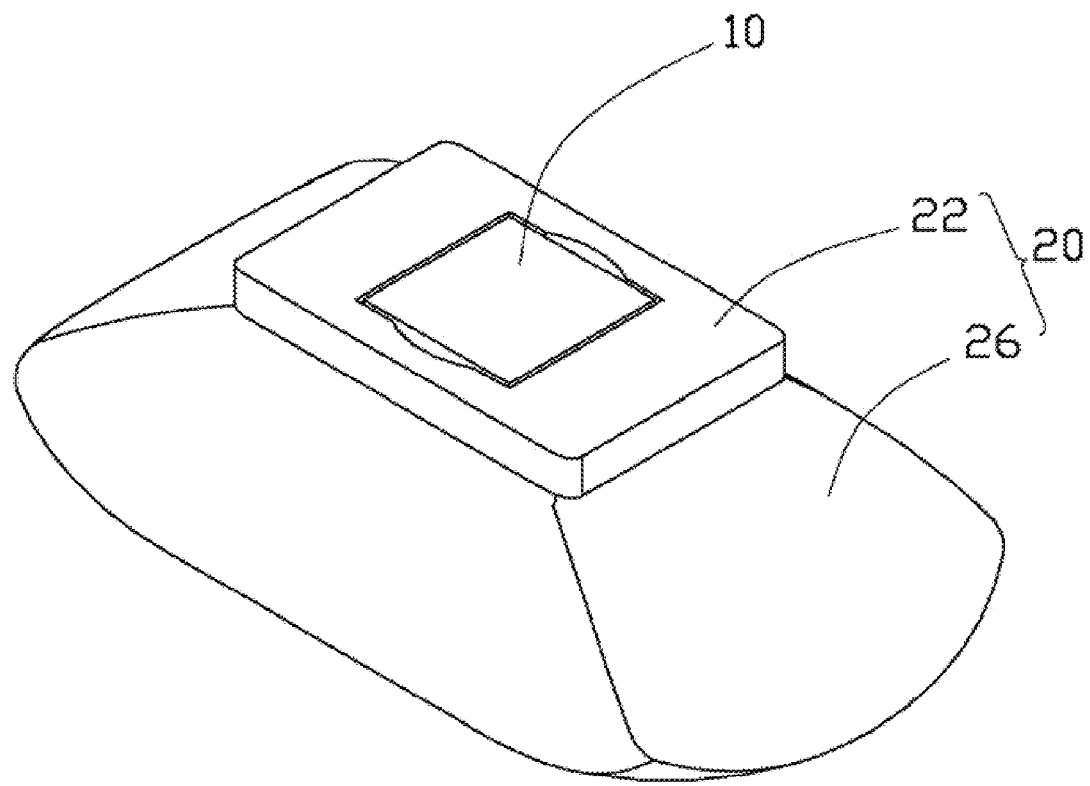
FIG. 3 is an inverted view of the LED module of FIG. 1.

Referring to FIGS. 3 and 4 simultaneously, the lens 20 includes a guiding portion 26 and a frame 22 formed at a bottom of the guiding portion 26. The frame 22 is substantially rectangular. An opening 220 is defined in a central portion of the frame 22 for receiving the LED 10 therein. When the LED module is assembled, the opening 220 communicates with the concave 120 of the base 12.

The guiding portion 26 of the lens 20 expands upwardly from the frame 22, and has a profile similar to an inverted frustum of a rectangular pyramid. The guiding portion 26 includes a concaved incident face 262 exposed to the opening 220 of the frame 22, an opposite convex emitting face 263, and a reflecting face 265 between the incident face 262 and the emitting face 263. The incident face 262 is provided for an incidence of the light generated by the LED 10 into the lens 20, while the emitting face 263 is provide for refracting the light to achieve a desired illumination performance. The reflecting face 265 reflects part of the light incident thereon towards the emitting face 263. Thus, all of the light of the LED 10 entering into the lens 20 can penetrate through the emitting face 263 to illuminate the outside.

Figure 5:
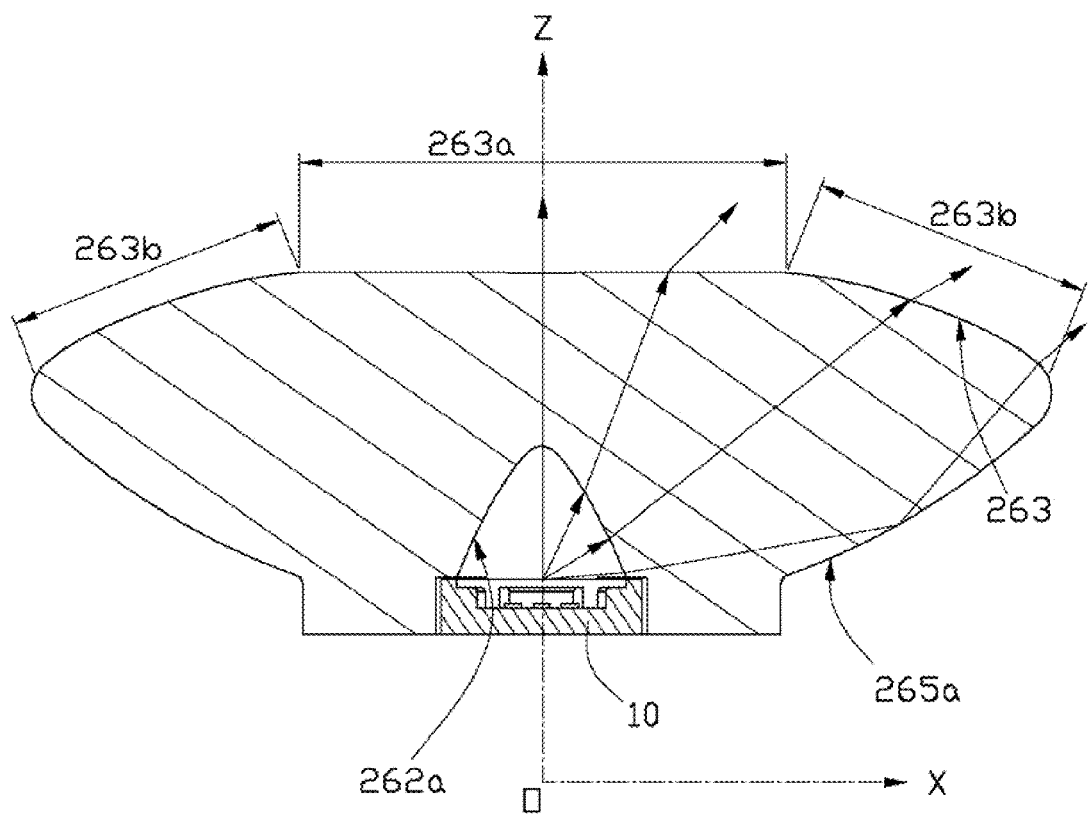
FIG. 5 is a cross-sectional view of the LED module of FIG. 1, taken along plane XOZ thereof.
Figure 6:
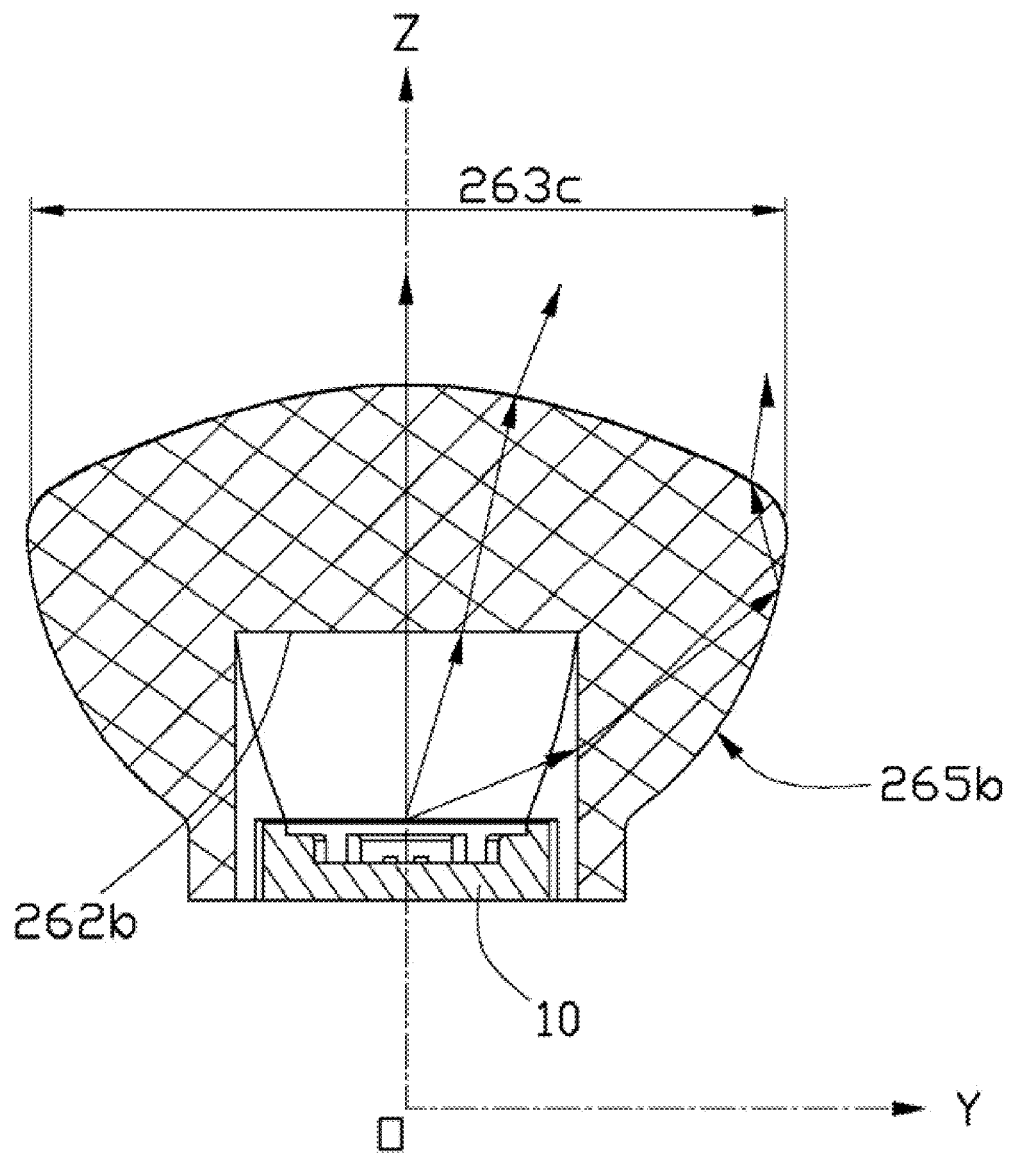
FIG. 6 is a cross-sectional view of the LED module of FIG. 1, taken along plane YOZ thereof.

Referring to FIGS. 5 and 6, the emitting face 263 of the guiding portion 26 of the lens 20 is arched. The emitting face 263 is symmetric relative to both the second plane YOZ and the first plane XOZ. A projection of the emitting face 263 on the third plane XOY is substantially rectangular. A curvature radius at any point of the emitting face 263 is larger than a distance between the point and a center of the LED 10.

The emitting face 263 has six parts, including two aspheric surfaces 2632 at a middle and four spherical surfaces 2634 at four corners. A curvature radius at any point of the aspheric surfaces 2632 is not smaller than that of the spherical surfaces 2634. The two aspheric surfaces 2632 are the same as each other and arranged at opposite sides of the first plane XOZ. Preferably, each aspheric surface 2632 is a part of a cylindrical surface. The two aspheric surfaces 2632 are smoothly connected together with a straight joint line 2633 located on the first plane XOZ and parallel to the X-axis. Along the Y-axis, each aspheric surface 2632 extends downwardly and curvedly from the joint line 2633.

The four spherical surfaces 2634 of the emitting face 263 are the same as each other. At each side of the first plane XOZ there are two spherical surfaces 2634. The two spherical surfaces 2634 at each side of the first plane XOZ are respectively connected to the other two spherical surfaces 2634 at the other side of the first plane XOZ smoothly. In addition, the two spherical surfaces 2634 at each side of the first plane XOZ are connected to opposite ends of a corresponding aspheric surface 2632 smoothly. The two aspheric surfaces 2632 and two of the spherical surfaces 2634 at the same end of the guiding portion 26 form a joint 2635. The joints 2635 are located on the joint line 2633.

Each of the spherical surfaces 2634 extends downwardly and curvedly from the corresponding joint 2635 along both the X-axis and the Y-axis. Each spherical surface 2634 and a center of an imaginary sphere on which the spherical surface 2634 is located are located at opposite sides of the first plane XOZ. For example, referring to two spherical surfaces 2634 at the right ends of the aspheric surfaces 2632, the center O1 corresponding to the spherical surface 2634 at the rear side of the first plane XOZ is located at the front side of the first plane XOZ, while the center O2 corresponding to the spherical surface 2634 at the front side of the first plane XOZ is positioned at the rear side of the first plane XOZ. The two centers O1, O2 of the two spherical surfaces 2634 at the same end of the aspheric surfaces 2632 space from the first plane XOZ with the same distances. The two spherical surfaces 2634 are symmetrical to each other in respect to the first plane XOZ.

Referring to FIG. 5, in the first plane XOZ, the emitting face 263 of the guiding portion 26 of the lens 20 includes a middle portion 263a corresponding to the joint line 2633 of the aspheric surfaces 2632 and two lateral portions 263b at opposite sides (i.e., left and right sides) of the middle portion 263a. The middle portion 263a is located over the LED 10, i.e., over the incident face 262. The middle portion 263a is substantially straight and parallel to the X-axis. A curvature radius of the middle portion 263a is infinite. The lateral portions 263b are the same as each other, each being a part of the spherical surfaces 2634. Each lateral portion 263b is arc-shaped and extends downwardly and outwardly from the middle portion 263a. A curvature radius of each lateral portion 263b is constant and the same as the other lateral portion 263b, being smaller than that of the middle portion 263a.

The incident face 262 of the guiding portion 26 of the lens 20 is concaved upwardly, and is symmetric relative to the second plane YOZ. As shown in FIG. 5, an incident part 262a corresponding to the incident face 262 is substantially a parabola which has a focus located on the Z-axis and on the second plane YOZ. The incidence face 262 has an open side facing the LED 10. For the cross section of the lens 10 taken along the first plane XOZ, a curvature radius at each point of the emitting face 263 (including the middle portion 263a and the lateral portions 263b) is larger than a curvature radius at a corresponding point of the incident part 262a. Thus, the light of the LED 10 after crossing the incident face 262 and the emitting face 263 of the lens 20 is divergent along the X-axis. In other words, a radiating angle of the LED module along the X-axis is enlarged relative to the radiating angle of LED 10 without the lens 20.

Referring to FIG. 6, in the second plane YOZ, a cross section of the incident face 262 is substantially rectangular. An incident portion 262b corresponding to the incident face 262 is straight and parallel to the Y-axis. A curvature radius of the incident portion 262b is thus substantially infinite.

An emission portion 263c in the second plane YOZ corresponding to the emitting face 263 is arc-shaped. A curvature radius at each point of the emission portion 263c is the same as the other points, and smaller than that of a corresponding point of the incident portion 262b. A distance between each point of the emission portion 263c and the center of the LED 10 is smaller than the curvature radius of the emission portion 263c at each point. Thus, the light of the LED 10 after crossing the incident face 262 and the emitting face 263 of the lens 20 is convergent along the Y-axis. In other words, a radiating angle of the LED module along the Y-axis is reduced relative to the radiating angle of LED 10 without the lens 20.

The reflecting face 265 includes four sides, i.e., front and rear sides 265b, and left and right sides 265a, extending from four sides of the frame 22, respectively. Each of the four sides 265a, 265b is curved. The front side 265b and the rear side 265b are the same as each other, while the left side 265a and the right side 265a are the same as each other. The front and rear sides 265b are located at opposite sides of the first plane XOZ, and are symmetric relative to the first plane XOZ. The left and right sides 265a are located at opposite sides of the second plane YOZ, and are symmetric relative to the second plane YOZ. Each of the left and right sides 265a connects outer edges of the spherical surfaces 2634 at the corresponding end of the emitting face 263. Each of the front and rear sides 265b has a top edge connecting the corresponding aspheric surface 2632 and two spherical surfaces 2634 at opposite ends of the corresponding aspheric surface 2632. A curvature radius at any point of the front/rear side 265b is smaller than a curvature radius at any point of the left/right side 265a of the reflecting face 265.

Referring to FIG. 5 again, along the X-axis, a thickness of a part of the guiding portion 26 of the lens 20 corresponding to the incident face 262 increases outwardly and gradually from the center optical axis, while other part of the guiding portion 26 corresponding to the spherical surfaces 2634 decreases outwardly and gradually. Referring to FIG. 6, along the Y-axis, a thickness of a part of the guiding portion 26 of the lens 20 corresponding to the incident face 262 decreases outwardly and gradually from the center optical axis. Other part of the guiding portion 26 of the lens 20 beside the incident face 262 also decreases outwardly and gradually. A distance between the emitting face 263 and the center of the LED 10 gradually increases from a center of the emitting face 263 along an outward direction, wherein the center of the emitting face 623 is located on the Z-axis. A distance between the incident face 262 and the center of the LED 10 gradually decreases from a center of the incident face 262 along an outward direction, wherein the center of the incident face 262 is also located on the Z-axis.

Figure 7:
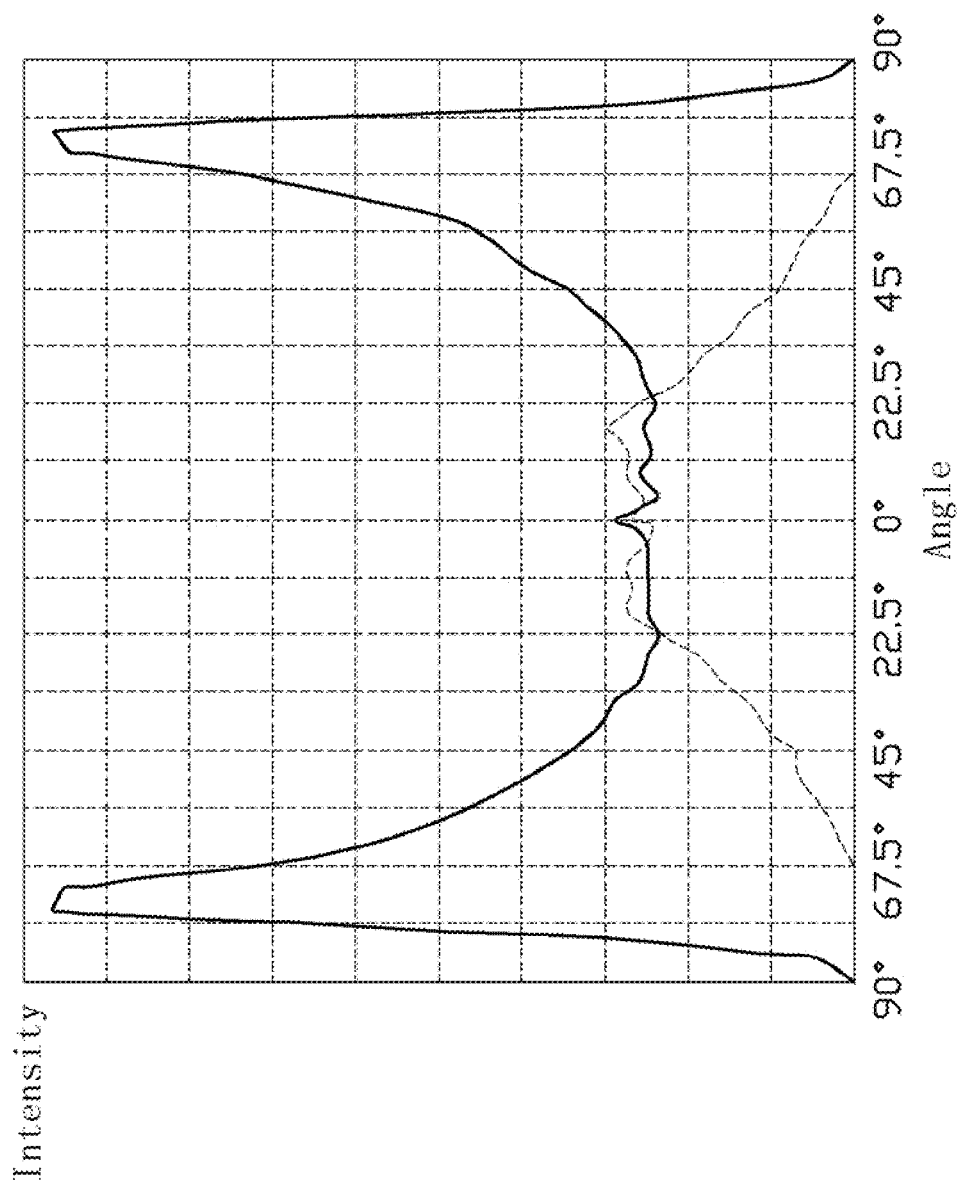
FIG. 7 is a graph indicating light intensities versus angles of the LED module of FIG. 1.

FIG. 7 shows a solid line and a dotted line respectively indicating the light intensities in the first plane XOZ and the second plane YOZ vs. the radiating angles of the LED module. In the first plane XOZ, the peak light emission for the LED 10 occurs within 68-78 degrees off the Z-axis. A range between 71-75 degrees is preferred. The light emission along the Z-axis is 24%-32% of the peak emission. The brightness within 0-25 degrees off the Z-axis has no sharp transitions. Half-peak light emission for the LED 10 occurs within 54-58 degrees and 80-82 degrees off the Z-axis. When the light off the Z-axis exceeds 75 degree, the light brightness decreases sharply.

In the second plane YOZ, the peak light emission for the LED 10 occurs within 0-22 degrees off the Z-axis. The peak light emission in the second plane YOZ is 24%-32% of the peak emission in the first plane XOZ, which is approximately equal to the light emission around the Z-axis in the first plane XOZ. Half-peak light emission in the second plane YOZ occurs within 33-40 degrees off the Z-axis.

As described above, since the half-peak intensity in the first plane XOZ occurs at a larger degree than that in the second plane YOZ, the brightness profile along the first plane XOZ extends a length longer than that extending along the second plane YOZ. Thus, a substantially rectangular brightness pattern is obtained, which is preferred to illuminate roadways, hallways, tunnels and so on, with more light in the longitudinally extending direction thereof, and less light in the transversely extending direction thereof; thus, roadside regions thereof which are not needed to be illuminated by the LED module have less or none light illuminating thereon.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An LED module comprising:
    an LED for generating light; and
    a lens covering the LED for refracting light emitted by the LED, the lens having a center axis and a concave incident face for incidence of the light and an opposite convex emitting face for refracting the light out of the lens;
    wherein the emitting face comprising a portion with a curvature radius at any point along a first plane being larger than a distance between the point and the LED, and larger than a curvature radius at a corresponding point of the incident face on the first plane;
    wherein a curvature radius at any point of the portion of the emitting face along a second plane which is perpendicularly intersected with the first plane at the center axis being larger than a distance between the point and the LED, while smaller than a curvature radius of a corresponding point at the incident face on the second plane; and
    wherein a radiating angle of the LED module in the first plane is larger than that of the LED module in the second plane.

2. The LED module of claim 1, wherein a curvature radius at any point of the entire emitting face along the first plane is larger than a distance between the point and the LED, while smaller than a curvature radius of a corresponding point at the incident face on the first plane, a curvature radius at any point of the entire emitting face along the second plane being larger than a distance between the point and the LED and larger than a curvature radius of a corresponding point at the incident face on the second plane.

3. The LED module of claim 1, wherein the emitting face of the lens is symmetric to at least one of the first plane and the second plane.

4. The LED module of claim 1, wherein the incident face of the lens is symmetric to at least one of the first plane and the second plane.

5. The LED module of claim 1, wherein the lens comprises a frame and a guiding portion expanding upwardly from the frame, the guiding portion having a profile being substantially an inverted frustum of rectangular pyramid, the incident face and the emitting face of the lens being formed on the guiding portion with the incident face adjacent to the frame.

6. The LED module of claim 5, wherein the frame defines a concave receiving the LED therein, the incident face facing the LED and concaved upwardly from a bottom of the guiding portion towards the emitting face.

7. The LED module of claim 6, wherein a cross section of the incident face parallel to the first plane is substantially a parabola which has a focus located on the second plane and an open side facing the LED.

8. The LED module of claim 5, wherein the emitting face extends curvedly and downwardly from a center thereof which is located on the center axis.

9. The LED module of claim 5, wherein on the second plane, a thickness of a part of the guiding portion of the lens corresponding to the incident face decreases outwardly from the center axis, while a thickness of the other part of the guiding portion decreases outwardly.

10. The LED module of claim 5, wherein on the first plane, a thickness of a part of the guiding portion of the lens corresponding to the incident face increases outwardly from the center axis, and a thickness of the other part of the guiding portion decreases outwardly.

11. The LED module of claim 5, wherein a distance between the emitting face and the LED gradually increases from a center of the emitting face, while a distance between the incident face and the LED gradually decreases from a center of the incident face.

12. The LED module of claim 1, wherein the emitting face comprises two aspheric surfaces being symmetric to the first plane and smoothly connected, and two spherical surfaces smoothly connected to opposite ends of each aspheric surface, the two spherical surfaces at opposite ends of each aspheric surface being symmetric to each other relative to the second plane.

13. The LED module of claim 12, wherein each spherical surface and a center of an imaginary spherical on which the each spherical surface is located are located at opposite sides of the first plane.

14. The LED module of claim 12, wherein the aspheric surface is part of a cylindrical surface.

15. The LED module of claim 1, wherein the LED comprises a base defining a concave receiving a plurality of LED chips therein.

16. An LED module comprising:
    an LED comprising a base and a plurality of LED chips for emitting light;
    an elongated lens comprising a frame and a guiding portion expanding from the frame, the frame defining an opening receiving the LED therein, the guiding portion having a center axis and a concaved incident face facing the LED chips and an opposite convex emitting face for refracting the light out of the lens;
    wherein the lens is symmetric to a first plane and a second plane perpendicularly intersected with the first plane at the center axis, a length of the lens along the first plane being larger than a width of the lens along the second plane; and
    wherein a curvature radius at any point of the entire emitting face along the first plane is larger than a distance between the point and the LED, while smaller than a curvature radius of a corresponding point at the incident face on the first plane, a curvature radius at any point of the entire emitting face along the second plane being larger than a distance between the point and the LED and larger than a curvature radius of a corresponding point at the incident face on the second plane.

17. The LED module of claim 16, wherein a cross section of the incident face on the first plane is substantially a parabola which has a focus located on the central axis and an open side facing the LED, while a cross section of the incident face on the second plane is substantially rectangular.

18. The LED module of claim 16, wherein the emitting face comprises two aspheric surfaces being symmetric to the first plane and smoothly connected, and two spherical surfaces smoothly connected to opposite ends of each aspheric surface, the two spherical surfaces at opposite ends of each aspheric surface being symmetric with each other relative to the second plane.

19. The LED module of claim 18, wherein each spherical surface and a center of an imaginary spherical on which the each spherical surface is located are located at opposite sides of the first plane.

20. The LED module of claim 18, wherein the aspheric surface is part of a cylindrical surface.

* * * * *